United States Patent [19]
Schneider

[11] Patent Number: 5,175,849
[45] Date of Patent: Dec. 29, 1992

[54] CAPTURING DATA OF A DATABASE SYSTEM

[75] Inventor: Frederick W. Schneider, Mountain View, Calif.

[73] Assignee: Amdahl Corporation

[21] Appl. No.: 632,604

[22] Filed: Dec. 20, 1990

Related U.S. Application Data

[63] Continuation of Ser. No. 225,341, Jul. 28, 1988, abandoned.

[51] Int. Cl.⁵ ............................................. G06F 15/40
[52] U.S. Cl. ..................... 395/600; 395/575; 364/266.5; 364/282.1; 364/285.1; 364/974; 364/941.9
[58] Field of Search ................ 395/600, 425, 575

[56] References Cited

U.S. PATENT DOCUMENTS

| | | | |
|---|---|---|---|
| 4,432,057 | 2/1984 | Daniell et al. | 364/300 |
| 4,498,145 | 2/1985 | Baker et al. | 364/900 |
| 4,627,019 | 12/1986 | Ng | 364/900 |
| 4,631,673 | 12/1986 | Haas et al. | 364/300 |
| 4,686,620 | 8/1987 | Ng | 364/200 |
| 4,815,028 | 3/1989 | Saitoh | 395/575 |
| 5,043,871 | 8/1991 | Nishigaki et al. | 395/600 |

OTHER PUBLICATIONS

Kim et al., "Data consistency and exchange among nested transactions in a database", IBM Technical Disclosure, vol. 27, No. 1B, Jun. 1984.

Aghili et al., "A practical guide to the design of differential file for recovery of on-time database," ACM Transaction on Database System, vol. 7, No. 4, Dec. 1982, pp. 540-565.

Kaunitz et al. "Database backup-the problem of very large databases," The Australian Computer Journal, vol. 13, No. 4, Nov. 1981, pp. 136-142.

Lien et al., "Consistency, Concurrency and Crash Recovery," Proceedings of the ACM SIGMOD International Conference on Management of Data, Austin, Texas 1978, pp. 9-14.

*Primary Examiner*—Lawrence E. Anderson
*Assistant Examiner*—Krisna Lim
*Attorney, Agent, or Firm*—David E. Lovejoy

[57] ABSTRACT

To create a snapshot copy of selected elements of a database in a data processing system, the selected elements are copied sequentially to a secondary storage device. During the copying operation, when a task requests to delete one of the selected elements from the database before it is copied to the secondary storage device, a record is made to identify the requested element, the task is allowed to continue processing. After the element has been copied to the secondary storage device, the identified element will be deleted based upon the record. Also, during the creation of the copy, when a task requests to update one of the selected elements, a duplicate copy of the requested element is created and the task is allowed to update the requested element. When it is time to copy the requested element to the secondary storage device, the duplicate copy will be used.

18 Claims, 6 Drawing Sheets

CAPTURING DATA OF A DATABASE SYSTEM

This application is a File-Wrapper continuation of Ser. No. 07/225,341, filed Jul. 28, 1988, now abandoned.

TECHNICAL FIELD

The present invention generally relates to a data processing system and particularly to the creation of a snapshot copy of selected elements of a database in a data processing system without substantially affecting the availability thereof.

BACKGROUND OF THE INVENTION

The need for a copy of selected elements of a database in a data processing system arises in many situations. For example, the copy may be used during an error recovery of the system to recreate the database, or it may be used to transfer the database to another system.

A database should be copied without destroying its consistency. To illustrate, consider a database wherein the accounts of two entities, A and B, are kept. Suppose a transaction is made to transfer money from A's account to B's account, the complete operation on the database due to this transaction would involve a process to debit A's account and a process to credit B's account. In order to preserve the consistency of the database copy, it should be made at an instant either before the start of both the debit and the .credit processes, or after the completion thereof. If the copy is made when only one of these two processes is completed or if one of the processes is allowed to occur during the copying, then the consistency of the copy would be destroyed.

Therefore, a copy of a database should be made at a time instant when the processes operating on the database are consider synchronized such synchronization, may be defined by certain criteria, such as the "Two-Phase Commit" protocol. Furthermore, when the copy is being made, the database as it exits at the synchronization time instant should not be disturbed. This typically means inhibiting access to the database so that elements of the database, as it exists at the synchronization point, will not be changed or deleted. But inhibiting access to the database basically means that processing of the data processing system be suspended, resulting in the degradation of the availability of the data processing system.

To avoid system degradation, some computer installations make database copies without suspending processing in the hope that any partially updated information can be repaired should it become necessary to use the copies. Other installations make database copies infrequently and plan to rerun a large portion of the workload during a system recovery.

An object of the present invention is to create a snapshot copy of selected database elements in a data processing system at a time instant when the database is known to be consistent. However, a related object of the invention is such that the copy is created without substantially impacting the availability of the system.

SUMMARY OF THE INVENTION

The present invention operates to create a snapshot copy of selected elements of a database in a data processing system. The database comprises a plurality of elements being stored in at least one intermediate storage device, each of the elements is asynchronously updatable and deletable by tasks operating within the data processing system. In accordance with the present invention, the snapshot copy is created by copying the selected elements sequentially to an secondary storage device. When the selected elements are being copied, if a task requests to delete one of the selected elements from the database before it has been copied to the secondary storage device, that element will be noted by the system and the task is allowed to continue processing. A noted element is deleted after it has been copied into the secondary storage device. Also, when the selected elements are being copied, if a task requests to update one of the selected elements, a duplicate copy of the requested element will be created in the intermediate storage device before it is updated and the element will be noted by the system. The element is then updated as requested. When it is time to copy such element, the duplicate copy will be used.

DESCRIPTION OF THE PREFERRED EMBODIMENT

Figure 1:
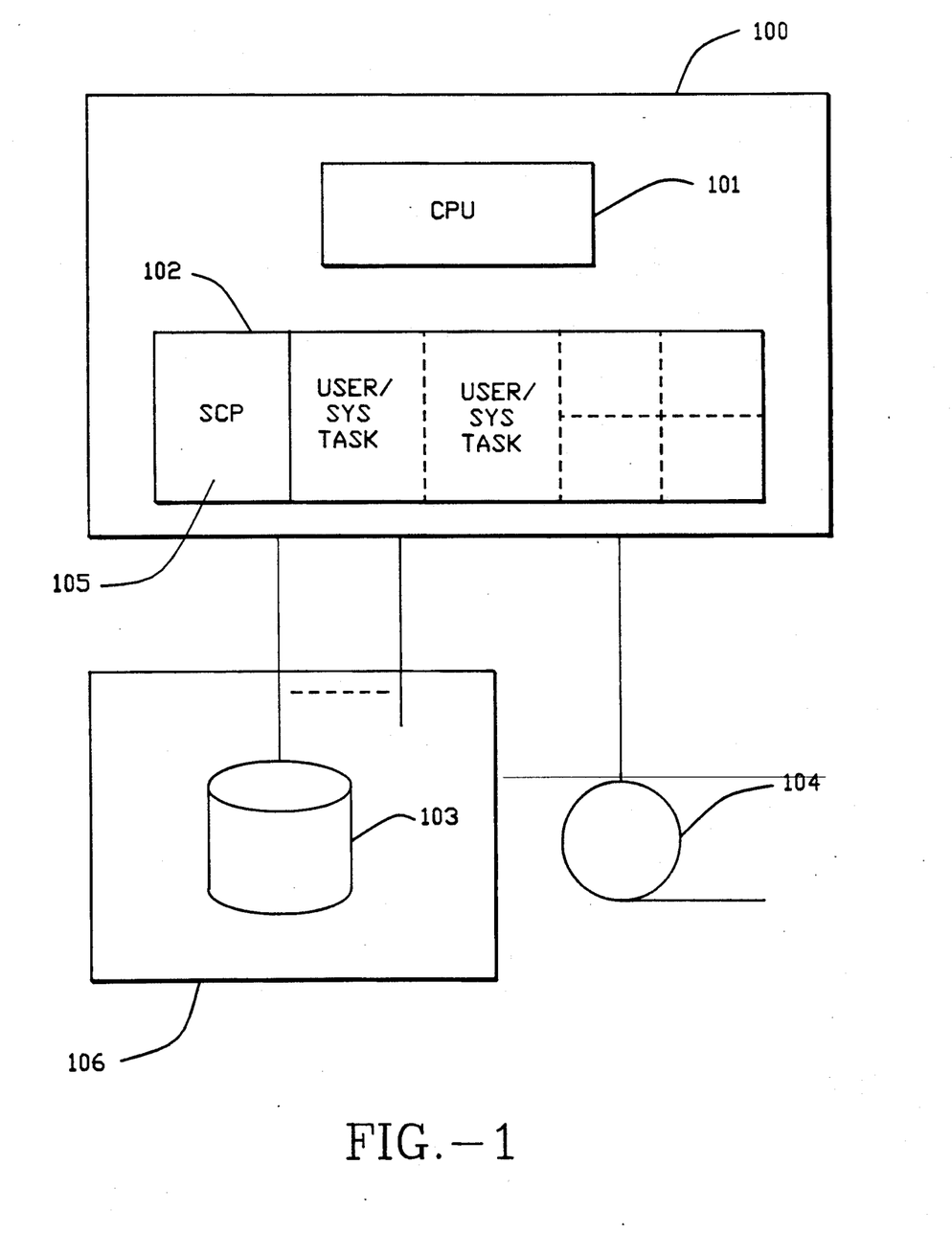
FIG. 1 is a block diagram representation of a computer system wherein the present invention is embodied.

Referring to FIG. 1, it shows a block diagram of a computer system 100 wherein the present invention is embodied. Computer system 100 includes a central processing unit (CPU) 101, a main memory 102, one or more intermediate storage device 103, and one or more secondary storage device 104.

The CPU 101 of computer system 100 has an architecture similar to the AMDAHL 580, the IBM System/370 as described in "System/370 Principles of Operation", IBM Publication number GA22-7085, and the IBM system/370 extended architecture as described in "System 370/Extended Architecture Principles of Operation", IBM Publication No. SA22-7085. The intermediate storage device 103 may be a direct access storage device (DASD) such as the magnetic disk. The secondary storage device 104 may be a magnetic tape.

In operation, CPU 101 accesses data directly from the main memory 102. The storage space provided by the main memory 102 is a subset of the storage space provided by the intermediate storage device 103. When a storage location accessed by the CPU 101 is not present in the main memory 102, that storage location will be paged into the main memory 102 from the intermediate storage device 103. Conversely, when free space in the main memory 102 is needed, selected portions thereof will be paged out to the intermediate storage device 103 so that the paged out locations in the main memory 102 can be reallocated to store other data.

Computer system 100 operates under the control of a system control program (SCP) 105 which resides in the main memory 102. The SCP 105 has an architecture similar to the IBM Multiple Virtual Storage (MVS) operating system or the IBM Virtual Machine (VM) operating system. It includes facilities for scheduling user and system tasks operating in the computer system 100. It also includes facilities for performing input/output operations between the CPU 101 and the intermediate storage device 103, and between the CPU 101 and the secondary storage device 104. The present invention is embodied in the SCP 105 as an improvement thereto.

Each intermediate storage device 103 in the computer system 100 is referred to as a "volume". A group of one or more volume 103, as shown in FIG. 1, is referred to as a "store" 106. Although one store 106 is shown in FIG. 1 and described in the preferred embodiment, it will be obvious that computer system 100 can have more than one store.

The storage space provided by each volume 103 is partitioned into a plurality of "slots" with a predetermined size (e.g. four kilobytes per slot). Each data file in the computer system 100 is stored in the intermediate storage device 103 as one or more pages each assigned to a separate slot. The content of each slot is updatable and deletable by user and system tasks running within the computer system 100. When a slot is deleted, it becomes free to be allocated to store other files.

Figure 2:
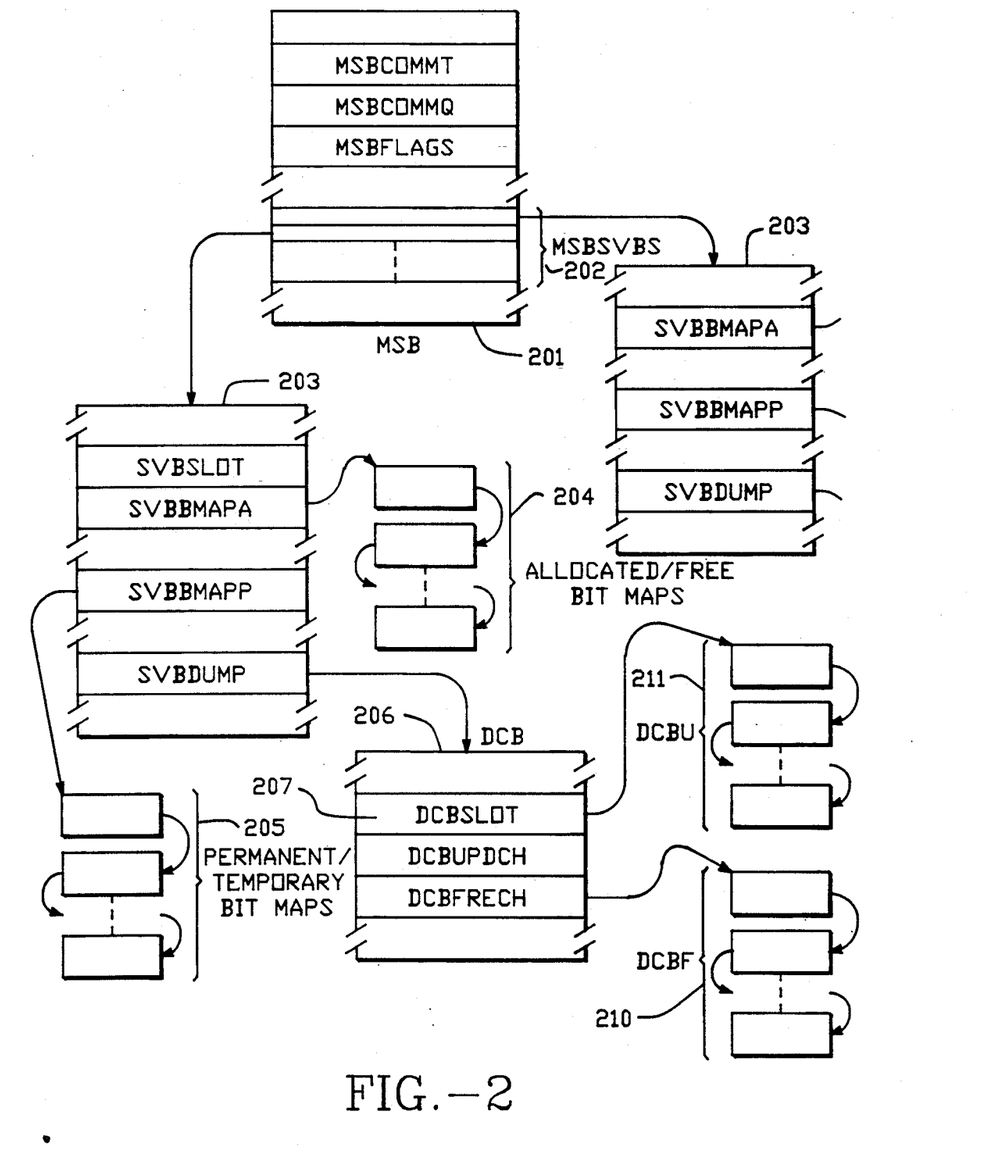
FIG. 2 is a block diagram representation of the control blocks which are used for managing data storage in the intermediate storage device of the computer system.

FIG. 2 is a block diagram showing a set of control blocks which are used in the preferred embodiment for managing the store.

At a predefined location in the main memory 102 is kept a control block, hereinafter called a mounted store block (MSB) 201, which contains management information and pointers to management information, relating to a store. The information of the MSB 201 is maintained and used by the SCP 105 and/or user tasks.

The MSB 201 has a plurality of pointers (MSBSVBS) 202, each of which points to a store volume block (SVB) 203. Each SVB 203 contains management information relating to an individual volume 103. Included in the SVB 203 is a field, SVBMAPA, which is used to access one or more allocated/free bit map 204. Also included in the SVB 203 is a field, SVBMAPP, which is used to access one or more permanent/temporary bit map 205. Each bit in the allocated/free bit map 204 and each bit in the permanent/temporary bit map 205 has a one-to-one correspondence to an individual slot in the volume 103. Thus, for example, if the storage space of a volume 103 is divided into 4024 slots, each of its allocated/free bit map 204 and permanent/temporary bit map 205 will have 4024 bits. Each bit in the allocated/free bit map 204 is used to indicate whether the corresponding slot is free or whether it has been allocated to a data file. When a slot is allocated, its corresponding bit will be set to a "0". Conversely, when a slot is free, its corresponding bit will be set to a "1". Each bit in the permanent/temporary bit map 205 is used to indicate whether the corresponding slot will be recreated during a reconstruction of the volume. A slot is permanent if its content will be recreated. A slot is temporary if it will not be reconstructed. A bit in the permanent/temporary bit map 205 corresponding to a permanent slot will be set to a "0". A bit corresponding to a temporary slot will be set to a "1". The position of each bit in the allocated/free bit map 204 and the permanent/temporary bit map 205 is a function of the physical position of the corresponding slot (e.g. the first bit corresponds to the first slot, the second bit corresponds to the second slot, etc) so that the physical location (e.g. cylinder address, head address, block address, etc) of a slot can be determined directly from the position of its corresponding bit in the bit maps 204, 205.

Each of the allocated/free bit map 204 and the permanent/temporary bit map 205 are stored as one or more temporary pages in the intermediate storage device 103 and will be paged into the main memory 102 when they are used.

The MSB 201 has a pointer to a table of contents which maps the pages of each file into their respective assigned slots in the store 106. The table of contents is stored as one or more permanent pages in the store 106 and will be paged into the main memory 102 if needed.

The MSB 201 has a field, MSBCOMMT, which is used for serializing, or locking access to the store. The MSBCOMMT is set and reset by tasks operating in the system. When MSBCOMMT is set by a task, access to the store 106 by other tasks will be inhibited. In the preferred embodiment, the MSBCOMMT is set and reset by a task based upon the "Two-Phase commit" protocol. A task sets the MSBCOMMT field by putting its task ID into the MSBCOMMT field.

When the store 106 is locked up by a task, tasks which need to access the store 106 will put their respective task ID's into a field, MSBCOMMQ, of the MSB 201 to wait for store 106.

A backup copy of a store 106 is typically created by executing a system task. The system task may be initiated by the system operator or by the SCP 105. In the following description, an operation to create a backup copy of the store 106 is also referred to as an operation to dump selected elements of the store 106 to the secondary storage device 104.

Figure 3:
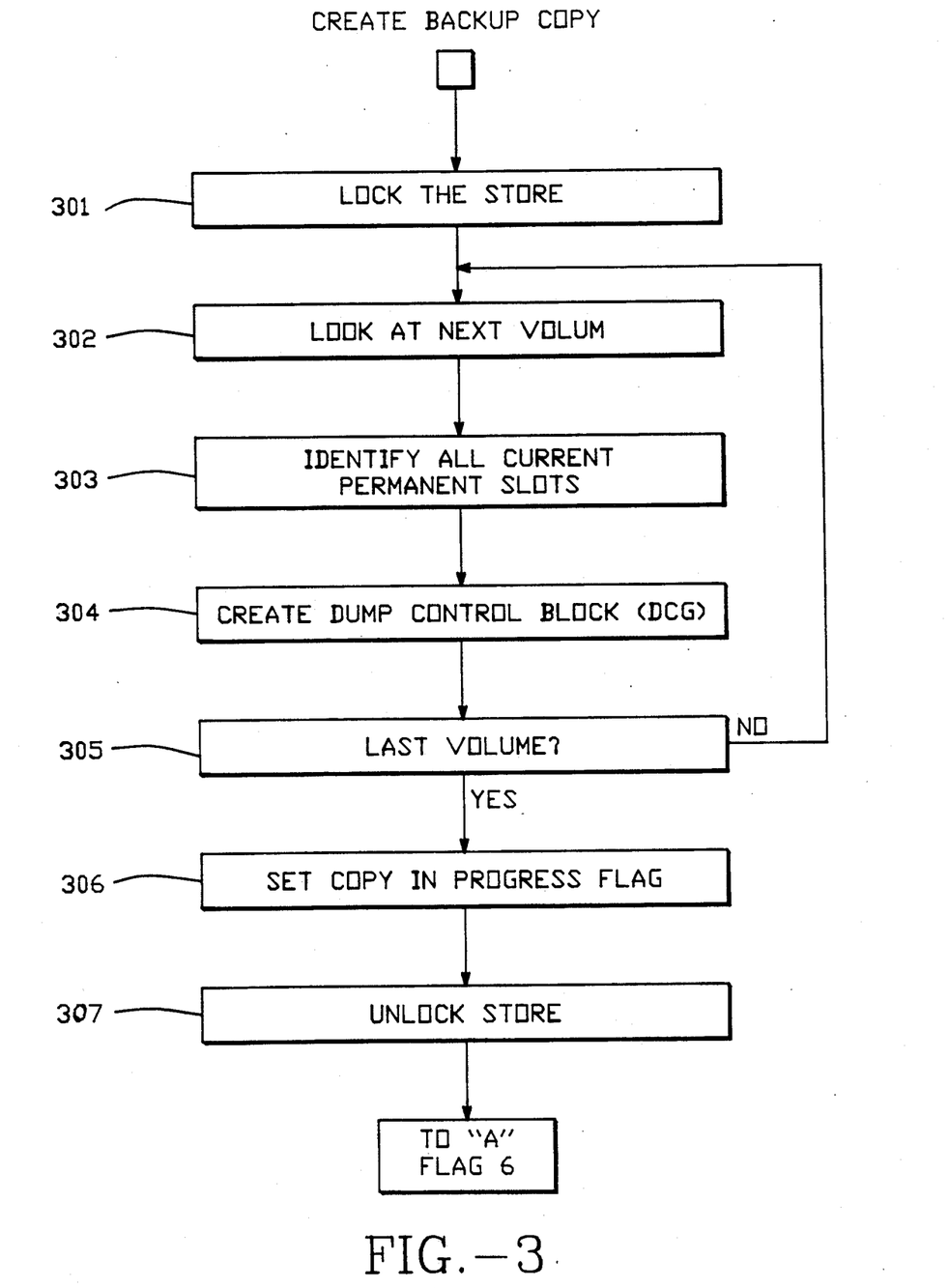
FIG. 3 is a flow chart representation of the method steps for identifying all the permanent slots whose content will be transferred to the backup copy.

Referring to the flow chart of FIG. 3, which illustrates the steps performed by the system task once it is initiated. In step 301, the lock, MSBCOMMT, to the store 106 is first obtained to serialize access thereto. An implementation of this step is given an example in the IBM System/370 assembly program listing of TABLE 1. When initiated, the task ID of the system task is stored by the SCP 105 in a predefined field, CURRMPB. In line 1.1, a "compare and swap" operation is performed to check whether MSBCOMMT is zero. If MSBCOMMT is equal to zero, then the task ID will be loaded into MSBCOMMT. Otherwise, if MSBCOMMT is not zero, the task ID will be loaded into MSBCOMMQ by the "compare and swap" instruction of line 1.3 and the task will be suspended (at line 1.4).

TABLE 1

LOCK UP A STORE

| | | | |
|---|---|---|---|
| DUMPSTART | EQU* | | Initiate R15 to 0 |
| | XR | R15,R15 | R1 = task ID |
| 1.0 | L | R1,CURRMPB | |
| 1.1 | CS | R15,R1,MSBCOMMT | Can we get the lock? |
| 1.2 | @IF | NZ | No, we must wait |
| | L | R15,MSBCOMMQ | |
| | ST | R15,MPBPAGQ | Chain him off me |
| 1.3 | CS | R15,R1,MSBCOMMQ | Put task ID in |
| | BNE | DUMPSTRT | If error, restart |
| | OI | MPBFLG1,MPBCMTWT | Show waiting for commit |
| 1.4 | JSUSP | RET=YES | Suspend task. |
| | B | DUMPSTRT | |
| 1.5 | @ENDIF | | |

Referring back to FIG. 3, in step 302, after the store 106 is locked by the system task, the SVB 203 of each volume 103 is accessed. From the SVB 203, the permanent/temporary bit map 205 is located. In step 303, a copy of the permanent/temporary bit map 205 is then copied to a buffer provided in the system task. When copy permanent/temporary bit map 205 is being copied to the task buffer, changes to the map 205 are inhibited because the MSBCOMMT is already set by the system task. Therefore, the copy of the permanent/temporary bit map 205 is a snapshot identification of all the permanent slots of which a copy is to be taken. In step 304, a dump control block (DCB) 206 is created for each volume 103 to control the dumping of volume to the secondary storage device 104. The DCB 206 is linked to the corresponding SVB 203 of that volume 103 by storing the address of its starting location into a field SVBDUMP provided in the SVB 203.

An implementation of steps 302 to 305 is given as an example in the assembly listing of TABLE 2. In line 2.1, the pointer to the SVB is loaded from MSBSVBS to register R6. In line 2.2, the number of volumes within the store is loaded into register R3. In line 2.3 each SVB of the store is examined. Between lines 2.5 to 2.6, the permanent/temporary bit map 205 of a volume 103, including its starting location and the number of pages containing the map, is obtained. In line 2.7, the location of the task buffer which is used to store the copy of the permanent/temporary bit map 205 is loaded into register R14. In line 2.8, the permanent/temporary bit map 205 of a volume is copied into the task buffer. In line 2.9, a buffer is obtained wherein a DCB 206 is created. In line 2.10, the DCB is linked to the volume by storing the address of the DCB 206 into the SVBDUMP filed of the DCB 206.

TABLE 2

IDENTIFY ALL THE SLOTS TO BE INCLUDED IN THE SNAPSHOT COPY

| 2.1 | LA | R6,MSBSVBS | Point at volume list |
|---|---|---|---|
| 2.2 | LH | R3,MSBVOLN | Get count of volumes |
| 2.3 | @DO | WHILE,(BCT,R3) | Do it for each volume |
|  | LA | R6,4(,R6) |  |
|  | LT | R7,0(R6) | Get the SVB again |
|  | @IF | P | Avoid holes |
| 2.4 | L | R8,SVBSLOT | Number of slots |
| 2.5 | LA | R7,SVBBMAPP | Point at next bit map |
|  | A | R8,=A(8*4096-1) | Round up |
|  | SRL | R8,12+3 |  |
|  | @DO | WHILE,(BCT,R8) | Do each pair |
|  | L | R1,0(R7) | Get MWP number |
|  | LR | R0,R1 |  |
| 2.6 | L | R15,=A(4096) | Page length |
| 2.7 | LA | R14,BUFFER | Buffer address |
|  | AR | R2,R15 |  |
|  | LR | R1,R15 |  |
| 2.8 | MVCL | R14,R0 | Copy the bit map |
|  | LR | R1,R9 |  |
|  | LA | R7,8(,R7) | Point at next map |
|  | @ENDDO |  |  |
| 2.9 | JGCEL | L'DCB | Address of DCB will be in R1 |
|  | XC | DCB,DCB | Clear it |
|  | L | R7,0(R6) |  |
|  | MVC | DCBID,=CL4'DCB' | Tag it |
|  | MVC | DCBPROC,,MPBPID | Identify it |
| 2/10 | ST | R1,SVBDUMP | Save it |
|  | @ENDIF |  |  |
|  | @ENDDO |  |  |

Referring again to FIG. 3, step 306, after the permanent/temporary bit map 205 of each volume 105 of the store 106 is copied to the task buffer, a flag MSGFLAGS, of the MSB 201 is set to indicate that a process has been initiated to create a copy of the store 106. In step 307, the store 106 is then unlocked by resetting MSBCOMMT, and tasks waiting for the store 106 will be allowed access thereto.

An exemplary implementation of steps 306 and 307 is given in the assembly program listed in TABLE 3. In line 3.1, the flag, MSBFLAGS, is et to indicate that a process has been initiated to create a backup copy. In line 3.2, the "exclusive-or" instruction is used to reset the MSBCOMMT. From lines 3.3 to 3.4, tasks which have been waiting to access the store 106 are activated.

TABLE 3

UNLOCK THE STORE

| 3.1 | OI | MSBFLAGS,MSBDUMP | Say we are dumping it |
|---|---|---|---|
| 3.2 | XC | MSBCOMMT,MSBCOMMT | Clear commit lock |
| 3.3 | @IF | (LT,R1,MSBCOMMO,NZ) | Is anybody waiting? |
|  | L | R14,MPBPAGQ |  |
|  | CS | R1,R14,MSBCOMMQ | Unchain next one |
|  | BNE | DMPUNLK |  |
|  | NI | MPBFLG1,FF-MPBCMTWT | Make him dispatchable |
|  | JMCAL | PRACT,,(R1) |  |
| 3.4 | @ENDIF |  |  |

The period in which the store 106 becomes inaccessible, and in which other tasks may be suspended, is limited to the duration for copying the permanent/temporary bitmap 205 to the task buffer. After the copy of the permanent/temporary bitmap 205 has been made, the system task then proceeds to sequentially dump the slots, which are identified in the bit map copy, to the secondary storage device 104.

Figure 4:
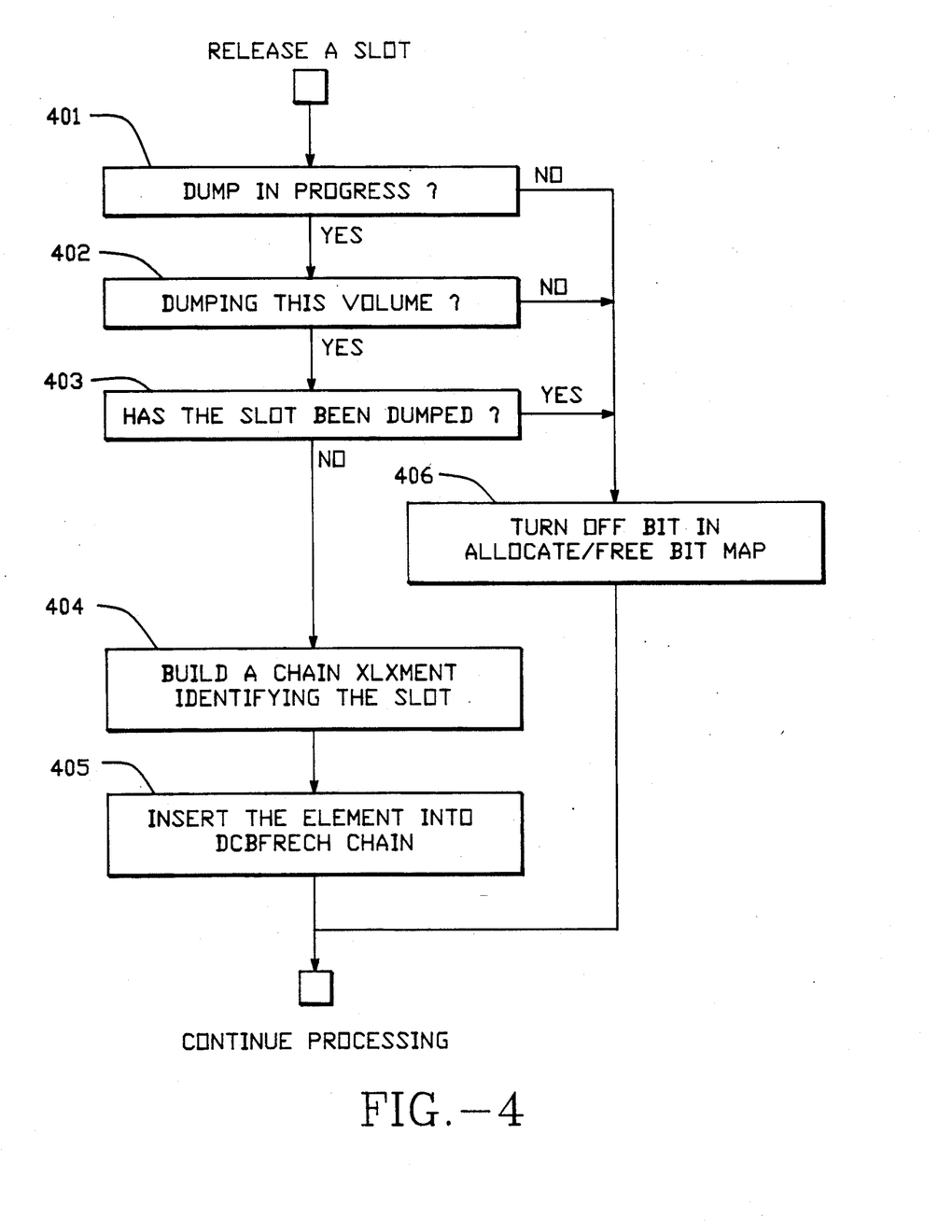
FIG. 4 is a flow chart representation of the method steps for releasing one or more slots when the database is being copied.

FIG. 4 is a flowchart illustrating the steps executed by a task in releasing a slot from the store 106. In step 401, the task first checks the MSB 201 to see whether a dump is in progress. If yes, then step 402 is performed to check whether the volume 103 which contains the slot targeted for the delete (the target slot) is involved in the dump. If so, then step 403 is performed to see whether the target slot has already been dumped. If the target slot has not been dumped yet, then step 404 is performed to create a DCBF element to identify the target slot. If the conditions identified in steps 401 to 404 are opposite, then the task releasing the target slot will simply turn off the corresponding bit in the permanent-/temporary bitmap 205 and continues processing.

In step 405, the DCBF element is inserted into a chain off a pointer, DCBFRECH, in the DCB 206. Each of the DCBF elements in this chain identifies the slots which will be deleted after they have been dumped into the secondary storage device 104. The position of a DCBF element in the chain depends upon the bit position, and therefore the physical location of the corresponding target slot.

An implementation of the steps shown in FIG. 4 is given as an example in the assembly listing of TABLE 4. In line 4.1, the slot number of the target slot is determined. In line 4.2, the MSBFLAGS is checked to see whether a dump is in progress. In line 4.3, a check is made to see whether a DCB 206 has been chained to the SVBDUMP field which check will indicate the corresponding volume is being involved in a dump. If the SVBDUMP field is not equal to zero, that means a dump has been initiated on the volume. In line 4.4, DCBSLOT, which contains the last and the highest slot dumped, is compared with the target slot. If the slot number of the target slot is greater than DCBSLOT, that means the target slot has not been dumped to the secondary storage device 104. From lines 4.5 to 4.6, a DCBF element is created for the target slot. Lines 4.7 to 4.8 are executed to insert the DCBF into the proper chain position. This is accomplished by comparing each DCBF element in the chain off DCBFRECH until a DCBF with a higher slot number than the target slot is found. A process, PUPDINS, is performed to insert the DCBF into that position.

TABLE 4

RELEASING A SLOT WHEN A COPY OF THE STORE IS BEING CREATED

```
4.1  L         R2,=A(SLOTSLOT) R2 Has slot # to be deleted
4.2  @IF (TM,MSBFLAGS,MSBDUMP,0)      A dump in progress
4.3  @IF       (LT,R6,SVBDUMP,NZ)     Is it on our volume?
4.4  C         R2,DCBSLOT             Are we affected?
     BNL       PUPDUMP                Yes, don't free it yet
     ............
PUPDUMP EQU *
4.5  SR        R4,R4                  Initialize R4
4.6  LT        R5,DCBFRECH            Get 1st free chain element
4.7  @DO WHILE,(C,R2,GT,DCBFSLOT) Find insertion point
     LR        R4,R5
     LT        R5,DCBFNEXT            Is there a next one?
     CALL      PUPDINS Insert the element into the chain
4.8  @ENDDO
```

The method to insert an element into a chain is commonly known in the art. Nevertheless, an example thereof is given in the assembly program listing of Table 5.

TABLE 5

INSERTING A DCBF INTO DCBFRECH

```
PUPDINS        EQU *
        LTR    R4,R4                  Was there a previous one?
        @IF    ZERO
        LT     R0,DCBF+L'DCBF-L'DCBFSLOT Full block?
        BNM    PUPDBLD                Yes, get a new block
        LR     R4,R5                  No, put it in this one
        @ENDIF
        LT     R0,DCBF+L'DCBF-L'DCBFSLOT Is it full?
        BNM    PUPDBLD                Yes, need new one
        ............
PUPDBLDX EQU *
        LA     R5,DCBFSLOT            Point at first existing slot
        LA     R3,DCBF#               Number of slots
        @DO    WHILE, (BCT,R3)
        CL     R2,0(R5)               Is this where it goes
        BL     PUPDINS2
        @ENDDO
PUPDINS2 EQU *
        @WHILE (BCT,R3)
        LTR    R4
        BM     RETURN
        L      R2,0(R5)
        ST     R4,0(R5)
        LA     R5,LDCBFSLOT(R5)
        @ENDO
```

Figure 5:
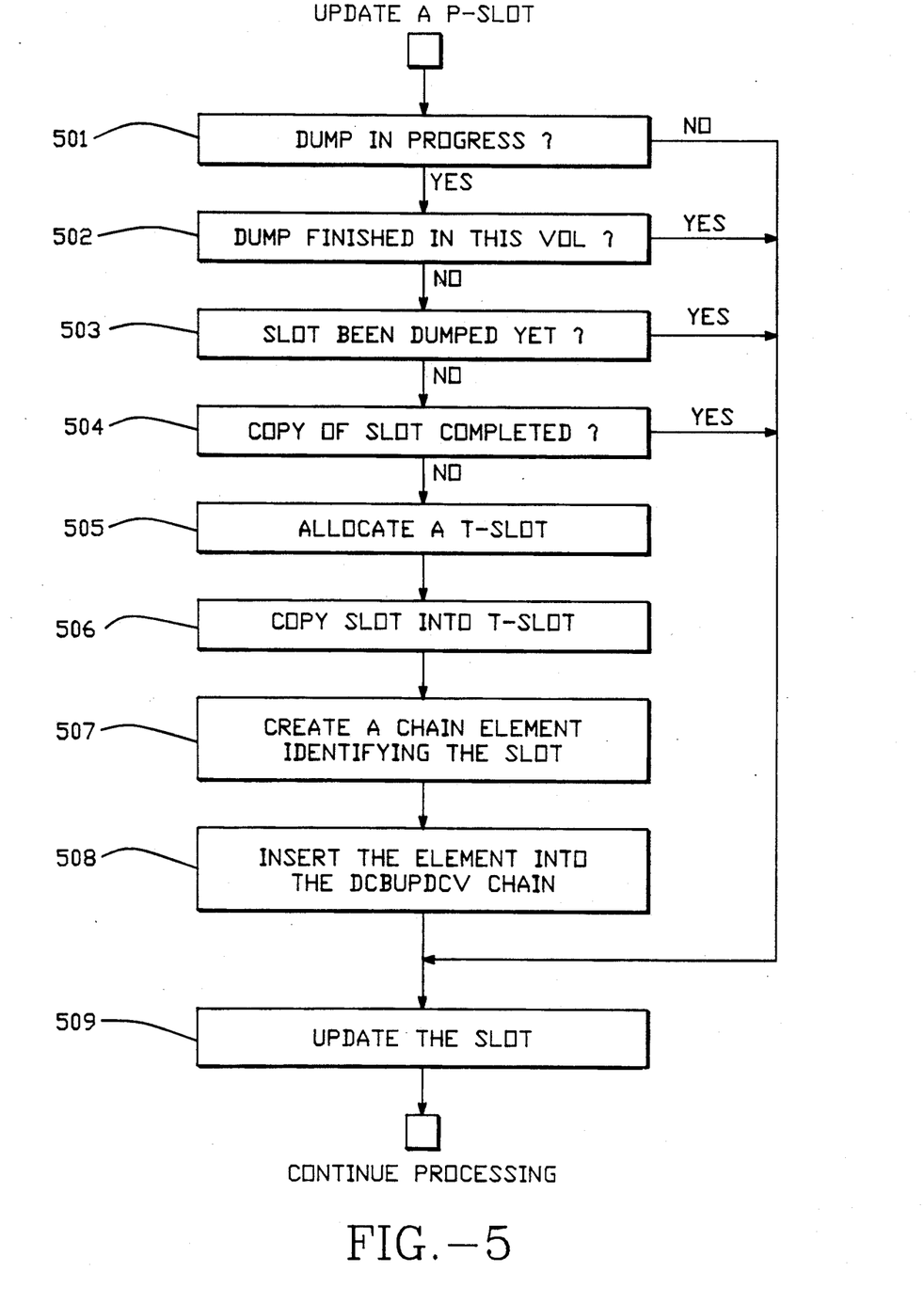
FIG. 5 is a flow chart representation of the method steps for updating one or more slots when the database is being copied.

FIG. 5 is a flow chart illustrating the steps performed by a task to update a slot (a target slot) in the store 106. In step 501, a check is made to see whether a dump is in progress with respect to the store 106. In step 502, a check is made to see whether the volume 103 which contains the target slot is involved in the dump process. In step 503, a check is made to see whether the target slot has already been dumped. If the above tests indicate that the target slot is involved in a dump process but which has not been dumped to the secondary storage device 104, then in step 504, a check is made to see whether a temporary copy of the target slot has already been made. If this is the first time the target slot is being updated since a dump process is initiated and thus no temporary copy of the slot has been made, then in step 505, the task will allocate a temporary slot in the volume 103. In step 506, the content of the target slot is copied to the temporary slot. In step 507, after the copy has been made, a DCBU element, which has a field to identify the temporary slot and a field to identify the target slot, is created. In step 508, the DCBU element is then put into a chain off a field, DCBUPDCH, in the DCB 206 of the volume 103. The task then updates the original target slot (step 509) and continues processing.

An exemplary implementation of the steps of in FIG. 5 is given in the assembly program listing in TABLE 6. From lines 6.1 to 6.2, a check is made to see: (1) whether a dump is in progress, (2) whether the volume is involved in the dump, and (3) whether the target slot has already been dumped into the secondary storage device 104. From line 6.3 to line 6.4, the slot location corresponding to each DCBU element in the update chain is compared with the target slot location. If an DCBU element has already been created for the target slot, then the task will update the original slot and continue processing. Otherwise, in line 6.5, a temporary slot is allocated.

The temporary slot is allocated by locating a free bit from the allocated/free bit map 204. When a free slot is allocated, the corresponding bit in each of the allocated/free bit map 204 and the permanent/temporary bit map 205 is marked accordingly. An example of how to allocate a temporary slot is given in the assembly program listing in TABLE 7. In TABLE 7, the allocated/free bit map 204 is searched starting from the bit address that corresponds to the disk cylinder currently being accessed by the system. Starting from that bit position, the allocated/fee bit map 204 is searched for a bit with a value of "1". After a free slot has been selected from the allocated/free bit map 204, the corresponding bit in the bit map 204 is set to a "0" and the address of the slot is generated directly from the bit position.

In line 6.6, after the temporary slot is allocated, the content of the target slot is then copied into the temporary slot. The method of copying the content from one storage location of a DASD to another location of the same DASD is commonly known and is not discussed here.

From lines 6.7 to 6.8, when the content of the target slot is copied successfully to the temporary slot, a DCBU element is obtained. The location of the target slot is put into a field, DCBUOLD, and the location of the temporary slot containing a copy of the target slot is put into another field, DCBUTEMP, of that DCBU element. After the DCBU element is built, it is inserted into the proper location within the chain off the DCBUPDCH field of the DCB 206.

TABLE 6

| | | UPDATING A PERMANENT SLOT DURING A COPY OPERATION | |
|---|---|---|---|
| 6.1 | L | R2.=A(SLOTVOL) R2 | Has slot # to be updated |
| | @IF | (TM.MSBFLAGS.MSBDUMP.0) | A dump in progress |
| | JMCAL | DMPCK.(R3),L=YES | See if it is still going |
| | @IF | (LT.R6.SVBDUMP.NZ) | Is it on our volume? |
| 6.2 | C | R2.DCBSLOT | Are we affected? |
| | BNL | UPDUMP | Yes. |
| UPDUMP | EQU * | | |
| 6.3 | @DO | WHILE.(DCBUNEXT.NE.ZERO) | |
| | @IF | (R2.EQ.DCBUOLD) | |
| | EXIT | | |
| | @ENDIF | | |
| 6.4 | @ENDO | | |
| 6.5 | @ALLOCATE A "TEMPORARY SLOT" | | |
| 6.6 | @COPY COPY CONTENT FROM SLOT TO TEMPORARY SLOT | | |
| 6.7 | SR | R4,R4 | Show no previous DCBU |
| | LT | R5,DCBUPDCH | Get 1st free chain element |
| | @DO | WHILE,(C.R2.GT.DCBUSLOT)Find insertion point | |
| | LR | R4,R5 | |
| | LT | R5,DCBUNEXT | Is there a next one? |
| | BZ | UPDINS | No, put it here |
| 6.8 | @ENDDO | | |

TABLE 7

| | ALLOCATING A TEMPORARY SLOT | |
|---|---|---|
| L | R1,SVBBMAPA(R5) | Get the virtual address |
| LA | R15,7(R7) | Round slot number up |
| CH | R6,=H'8' | a byte to look at? |
| LA | R4,7 | Mask for bit number |
| LA | R2,X'FF' | Set up for a mask |
| BL | POTCYSK6 | |
| N | R15,=X'00007FF8' | Extract low bit number |
| LA | R14,0(R6,R7) | Point at last slot |
| @IF | ZERO | A fragment of a byte? |
| LR | R15,R7 | |
| N | R15,=X'00007FF8' | Was it really zero |
| @IF | NZ | It really is a fragment |
| LR | R15,R1 | |
| A | R15,=F'4096' | Point past last byte |
| LNR | R0,R2 | Set flag: 2nd page needed |
| B | POTCYSK7 | |
| @ENDIF | | |
| @ENDIF | | |
| N | R14,=X'00007FF8' | Extract high bit number |
| SR | R14,R15 | Is high bit on same page? |

TABLE 7-continued

ALLOCATING A TEMPORARY SLOT

|   |   |   |   |
|---|---|---|---|
| | LR | R0,R14 | Save value |
| | @IF | MINUS | If R14<R15 it crosses a page |
| | L | R14,=X'00008000' | |
| | SR | R14,R15 | Get count to end of page |
| | @ENDIF | | |
| | SRDL | R14,3 | Get byte numbers |
| | AR | R15,R1 | Point at first byte |
| | BCTR | R14,0 | Reduce for EX |
| | EX | R14,POTTRT | Look for a bit |
| | BNZ | GOTBIT | So much for the TRT! |
| POTCYCK7 | DS | 0H | |
| | NR | R4,R7 | Get the bit number |
| | LR | R1,R15 | Get that first byte |
| | BZ | POTCYSK2 | Exact hit |
| | BCTR | R1,0 | Back to partial one |
| | SRL | R2,0(R4) | Generate a mask |
| | IC | R4,0(R1) | |
| | NR | R2,R4 | Extract the byte |
| | BZ | POTCYSK2 | No, go check out tail end |
| POTCYSK5 | LA | R4,TRTTAB(R2) | |
| | IC | R2,0(R4) | Go get it |
| | B | GOTBIT | Go take it |
| POTCYSK2 | LTR | R0,R0 | Lap over into next page? |
| | LA | R1,1(R14,R15) | Point at last byte |
| | BM | POTCYSK1 | Yes, look in next page |
| POTCYSK6 | LA | R14,0(R6,R7) | |
| | L | R2,=X'0000FF00' | Prepare to create a mask |
| | N | R14,=F'7' | Get number of bits left |
| | SRL | R2,0(R14) | Get the mask |
| | IC | R14,0(R1) | |
| | NR | R2,R14 | Look for a bit |
| | BNZ | POTCYSK5 | Yes, go use it |
| | BR | R10 | Cylinder is full |
| POTPUTER | EQU | * | |
| | L | R5,SVBMSB | Make the store read only |
| | B | SLPERR | |
| POTNOBMP | MVI | JSAR1,X'FF' | Show bitmap not in |
| POTCYSK1 | AR | R6,R7 | Get number of last slot |
| | A | R7,=X'00008000' | Round up |
| | N | R7,=X=FFFF8000' | Get page boundary |
| | SR | R6,R7 | Get number to be done |
| | BP | POTCYSK4 | Go retry with those values |
| | SR | R1,R1 | Set cc |
| | BR | R10 | |
| GOTBIT | EQU | * R1->byte,R2=bit number +1 | |
| | BCTR | R2,0 | Reduce bit number |
| | LR | R14,R1 | Save byte pointer |
| | N | R1,=X'0000FFF' | Get page offset |
| | ICM | R5,B'0110',SVBVLNUM | Add volume number |
| | L | R0,SVBTSCNT | Get T-slot count |
| | SLL | R1,3 | Build page number |
| | SLL | R5,12 | Restore high bits |
| | A | R0,=F'1' | |
| | OR | R1,R2 | |
| | A | R2,=V(BITSOFF) | Point at bit mask |
| | ST | R0,SVBTSCNT | Increment T-slot count |
| | OR | R1,R5 | Finish the slot number |
| | NC | 0(1,R14),0(R2) | Allocate the slot |
| | ST | R1,JSAR1 | |
| | SR | R15,R15 | Set return code |
| | B | POTRET | return |
| POTTRT TRT | | 0(*-*,R15),TRTTAB | Look for a bit that's on |
| TRTTAB JC | | AL1(0,8,7,7,6,6,6,6,5,5,5,5,5,5,5,5) | |
| | DC | 16AL1(4),32AL1(3),64AL1(2),128AL1(1) | |

From FIG. 4 and FIG. 5, it is obvious that while the store 106 is being copied into the secondary storage device 104, an operation to delete a slot or an operation to update a slot is not suspended but may continue processing.

Figure 6:
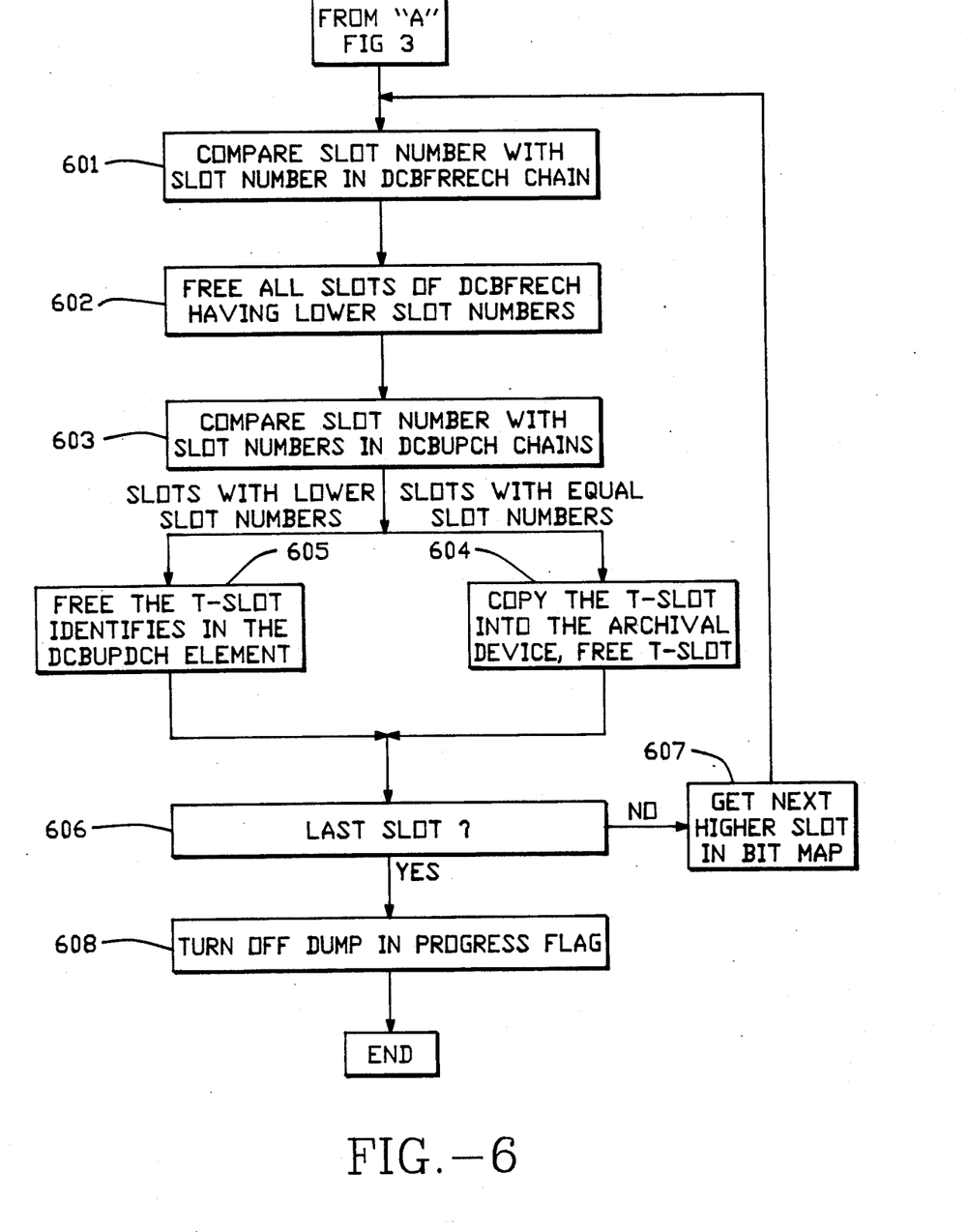
FIG. 6 is a flow chart representation of the method steps being performed when a slot is transferred into the backup copy.

FIG. 6 is a flow chart representation of the steps performed when a slot in the store 106 is copied into the secondary storage device 104. The steps of FIG. 6 are basically performed after the steps of FIG. 3 and, in the preferred embodiment, by the same task. During the dump process, each slot identified in the temporary copy of the permanent/temporary bit map 205 is processed sequentially. The slot address corresponding to the bit currently being processed (the current slot) is stored in a field, DCBSLOT, in the DCB 206. In step 601, before the current slot is dumped, a check is made in the DCBF chain to see whether there are any permanent slots that need to be deleted. To speed up processing, the location of the last deleted slot in the chain DCBF is stored in a field, DCBFSLOT, in the DCB 206. If DCBSLOT is greater than DCBFSLOT, that means that then there are slots in the DCBF chain which have already been dumped and need to be deleted, and the DCBF chain is examined. In step 602, slots in the DCBF chain which have slot numbers lower than current slot are deleted. The delete is being performed by turning off a corresponding bit in the allocated/free bit map 204. After a slot is deleted, the corresponding DCBF element is then freed.

An exemplary implementation of step 602 is given by the assembly program listing of TABLE 8. In line 8.1, the start of the DCBF chain is fetched. In line 8.2, the slots in the DCBF chain which have a slot number lower than the slot being dumped are fetched. In line 8.3, a routine is called to turn off the corresponding bit in the allocated/free bit map 204. From line 8.4 to 8.5, the next DCBF is fetched.

TABLE 8

PROCESSING THE DCBF CHAIN

```
8.1  @IF (LT,R5,DCBFRECH,NZ) Any slots to be free?
8.2  @DO WHILE,(CLC,DCBSLOT,GT,DCBFSLOT) Should be freed?
     . . . . . . . . . . . . . . . .
8.3  call @FREE Free the P-slot
8.4  MVC    DCBFSLOT(4*(DCBF#-1)),DCBFSLOT+4 ripple down
     MVC    DCBSLOT+4*(DCB#-1)(4),=X'FFFFFFFF'
     CLI    DCBFSLOT,X'FF'
     @IF    EQ
8.5  MVC    DCBFRECH,DCBFNEXT
     EXIT
     @ENDIF
     @ENDDO
     @ENDIF
```

Referring back to FIG. 6, in step 603, the DCBU chain, which identifies slots to be updated, is checked. The DCBU elements whose respective DCBUOLD fields contain a slot number which is lower or equal to the current slot are processed. If the DCBUOLD field is equal to the slot number of the current slot, it means that a copy of the slot has been created in a temporary slot, then in step 604, the temporary copy is dumped into the secondary storage device 104 instead of the original slot.

If the DCBUOLD field of an DCBU element is lower than the current slot, then in step 605, the temporary slot identified in the DCBU is freed without dumping the content thereof into the secondary storage device 104. The reason is because these DCBUs belong to permanent slots which are created after the dump process has been initiated, and the DCBU were created because these newly created permanent slots were updated after the dump process was initiated.

An implementation of steps 603 to 605 is given in TABLE 9. In line 9.1, the DCBUs that correspond to slots with lower slot number then the current slot are fetched. From lines 9.2 to 9.3, a DCBU with the same slot number as the current slot is processed. Line 9.2a specifies that the content of the T-slot is to be copied to the secondary storage device. Line 9.3 specifies the T-slot is to be freed afterward. From lines 9.4 to 9.5, the slots with lower slot numbers are processed. The subroutine SLPUT is called to turn off a bit in the allocated/free bit map corresponding t the T-slot to be freed. In lines 9.6 to 9.7, the next DCBU is fetched. In lines 9.8-9.9, the DCBUs which have been processed are freed.

TABLE 9

PROCESS THE DCBU CHAIN

```
         @IF      (LT,R5,DCBUPDCH,NZ)       Are there DCBU's?
9.1      @DO      WHILE,(C,R9,GE,DCBUOLD)
9.2      @IF      EQ           Is this the one?
9.2a     MVC      VSTSLOTC,DCBUTEMP         Yes use T-slot instead
9.3      NI       VSTFLAG,FF-VSTPSLOT Make MUN free the slot
9.4      @ELSE             Allocated after dump started
         LT       R1,DCBUTEMP
         L        R0,SVBMSB
         @IF      NZ
         JMCAL SLPUT,(R0),(R1),L=YES        Free the T-slot
         @ENDFI
9.5      @ENDIF
9.6      MVC DCBUOLD(8*(DCBU#-1),DCBUOLD+8 Ripple down
         XC       DCBUOLD+8*(DCBU#-1)(8),DCBUOLD+8*(D-
                  CBU#-1)
9.7      OC       DCBUOLD,DCBUOLD           Any more here?
         @IF      ZERO
9.8      MVC      DCBUPDCH,DCBUNEXT
         JFCEL       (R5),L'DCBU
         LT       R5,DCBUPDCH
9.9      @ENDIF
      @ENDDO
         @ENDIF
```

In summary, a snapshot copy of the database can be made according to the present invention without substantially affecting the availability of a data processing system even through the content of the copy is not affected by operations performed on the database while it is being copied.

The foregoing description of the preferred embodiment of the present invention has been presented for the purpose of illustration and description. It is not intended to be exhaustive or to limit the invention to the precise form disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with various modifications as such suit to the particular use contemplated. It is intended that the scope of the invention be defined by the accompanying claims and its equivalents.

What is claimed is:

1. In a data processing system having a database comprising a plurality of elements being stored in at least one storage device, each of the elements being asynchronously updatable and deletable by tasks operating within the data processing system, a computer implemented method for creating a snapshot copy of selected elements of the database, comprising the steps of:

copying sequentially said selected elements from said storage device storing said selective elements into a secondary storage device;

identifying, in response to a request from a task operating in said data processing system to delete one of said selected elements while said sequential copying of said selected elements is in progress, in a first record, stored within said data processing system, said selected element to be deleted if said selected element has not bee copied to said secondary storage device at the time when said request for deletion was made;

deleting said identified selected element as identified in said first record after said identified selected element has been copied to said secondary storage device;

creating and storing in a temporary storage, in response to a request from a task operating within said data processing system to update one of said selected elements while said sequential copying of said selected elements is in progress, a duplicate copy of said selected element to be updated before said selected element is updated if said selected element has not bee copied to said secondary storage device at the time when said request to update was made;

identifying said selected element in a second record stored within said data processor system if a duplicate copy of said selected element has been stored in said temporary storage;

updating said selected element to be updated stored in said storage device;

copying from said temporary storage said duplicate copy of a said selected element identified in said second record to said second storage device when said update selected element would have been sequentially copied to said second storage device.

2. The method of claim 1, further comprising the steps of providing and periodically updating a map which identifies elements selected to be included in said snapshot copy.

3. The method of claim 2, comprising the steps of copying and storing said map in response to said request to create said snapshot copy thereby identifying said selected elements to be included in said snapshot copy.

4. The method of claim 3, wherein the step of copying said map includes the steps of inhibiting access to the database immediately before making said copy of said map and immediately enabling access to the database after completion of said copy of said map.

5. The method as in claim 1 further including the steps of detecting a synchronization point and initiating the creation of said snapshot copy of said database when said synchronization point is detected.

6. The method as in claim 5, wherein said synchronization point is detected using a two-phase commit protocol.

7. In a data processing system having a database comprising a plurality of elements being stored in at least one storage device, each of the elements being asynchronously updatable and deletable by tasks operating within the data processing system, a computer implemented method for creating a snapshot copy of selected elements of the database, comprising the steps of:

a. providing and continuously maintaining a map to identify elements to be selected for inclusion in a snapshot copy of the database;

b. in response to a command from said data processing system to create a snapshot copy of the database performing the steps of:

b1. creating a copy of said map to identify said elements selected for said snapshot copy; and b2. disabling access to the database only during the period of time said map is being copied;

c. copying said selected elements identified in said map copy sequentially into a secondary storage device;

d. in response to a request from a task operating within said data processing system to delete a said selected element while said sequential copying of said selected elements is in progress performing the steps of:

d1. identifying said selected element to be deleted in a first record stored in said data processing system if said selected element to be deleted has not been copied into said secondary storage device; and d2. deleting each said identified selected element in said first record after each said identified selected element has been copied into said secondary storage device; and e. in response to a request from a task operating within said data processing system to update a said selected element while said sequential copying of said selected elements is in progress performing the steps of:

e1. creating and storing in a temporary storage a temporary copy of said selected element to be updated before said selected element is updated if said selected element has not been copied to said secondary storage device;

e2. identifying in a second record stored in said data processing system a said selected element to be updated if said temporary copy of said selected element has been stored in said temporary storage;

e3. updating said selected element to be stored in said storage device;

e4. copying from said temporary storage said temporary copy of a said selected element, identified in said second record, to said secondary storage device when said updated selected element would have been sequentially copied to said secondary storage device.

8. The method as in claim 7, further including the steps of detecting a synchronization point and initiating the creation of said snapshot copy when said synchronization point is detected.

9. The method as in claim 8, wherein said synchronization point is detected using a two-phase commit protocol.

10. In a data processing system having a database comprising a plurality of elements being stored in at least one storage device, each of the elements being asynchronously updatable and deletable by tasks operating within the data processing system, an apparatus for creating a snapshot copy of selected elements of the database, comprising:

first means, in response to a request from said data processing system to create said snapshot copy, fir copying said selected elements sequentially into a secondary storage device;

first recording means, in response to a request from a task operating in said data processing system to delete one of said selected elements and where said deletion request occurs when said first means is in the process of sequentially copying said snapshot copy, for identifying said selected element to be deleted if said selected element has not been copied to said secondary storage device;

second means responsive to said first recording means for deleting each said identified selected element as identified by said first recording means after each said identified selected element has been copied to said secondary storage device;

temporary storage means;

third means, in response to a task operating in said data processing system requesting to update one of said selected elements and where said update request occurs when said first means is in the process of copying said snapshot copy, for creating and storing in said temporary storage means a temporary copy of said selected element to be updated before said selected element is updated if said selected element has not been copied to said secondary storage device;

second recording means for identifying said selected element to be updated for which a temporary copy has been stored in said temporary storage by said third means;

fourth means for updating said selected element to be stored in said storage device;

fifth means responsive to said second recording means for copying from said temporary storage said temporary copy of said selected element as identified by said second recording means into said secondary storage device when said updated selected element would have been sequentially copied into said secondary storage device.

11. The apparatus as in claim 10, further comprising means for maintaining a map of elements selected to be included in said snapshot copy of said database.

12. The apparatus as in claim 11, comprising fifth means, in response to said request to create said snapshot copy of said database, for copying said map to identify said selected elements to be included in said snapshot copy.

13. The apparatus of claim 12, wherein said fifth means includes sixth means for inhibiting access to said database during the period of time that said map is being copied.

14. The apparatus as in claim 10, further including seventh means for detecting a synchronization point and eighth means for initiating the creation of said snapshot copy when said synchronization point is detected.

15. The apparatus as in claim 14, wherein said synchronization point detected by said seventh means is detected using a two-phase commit protocol.

16. In a data processing system having a database comprising a plurality of elements being stored in at least one storage device, each of the elements being asynchronously updatable and deletable by tasks operating within the data processing system, an apparatus for creating a snapshot copy of selected elements of the database, comprising:

a. first means for identifying in a map selected elements which will be selected to be included in a snapshot copy of said database;

b. second means, in response to a request from said data processing system to create said snapshot copy of the database, for creating a temporary copy of said map to identify said selected elements to be included in said requested snapshot copy;

c. third means for disabling access to the database during the period of time during which said second means is creating said temporary map;

d. fourth means for sequentially copying said selected elements identified in said temporary map into a secondary storage device;

e. first record means, response to a request from a task operating within said data processing system to delete said selected element when said request is made while said fourth means is in the process of copying all said selected elements, for identifying said selected element to be deleted if said selected element to be deleted has not been copied into said secondary storage device;

f. fifth means for deleting said identified selected element as identified by said first record means after said identified selected element has been copied to said secondary storage device;

g. temporary storage;

h. sixth means, responsive to a request from a task operating within said data processing system to update a said selected element when said request to update a selected element is made while said fourth means is in the process of sequentially copying all said selected elements, for creating and storing in said temporary storage a temporary copy of said selected element to be updated before said selected element to be updated is updated;

i. second record means for identifying said selected element to be updated if said temporary copy of said selected element has been stored in said temporary storage by said sixth means;

j. seventh means for updating said selected element to be stored in said storage device; and k. eighth means for copying from said temporary storage said temporary copy of a said selected element as identified in said second record means to said secondary storage device when said updated selected element would have been sequentially copied into said second secondary device.

17. The apparatus as in claim 16, further including a ninth means for detecting a synchronization point and for initiating the creation of said snapshot copy when said synchronization point is detected.

18. The apparatus as in claim 17, wherein said synchronization point detected by said ninth means is detected using the two-phase commit protocol.

* * * * *